(12) United States Patent
Burton et al.

(10) Patent No.: US 6,715,036 B1
(45) Date of Patent: Mar. 30, 2004

(54) METHOD, SYSTEM, AND DATA STRUCTURES FOR TRANSFERRING BLOCKS OF DATA FROM A STORAGE DEVICE TO A REQUESTING APPLICATION

(75) Inventors: David Alan Burton, Vail, AZ (US); Norio Fujita, Shiga-Ken (JP); Robert Louis Morton, Tucson, AZ (US); Koji Nakase, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 09/628,394

(22) Filed: Aug. 1, 2000

(51) Int. Cl.$^7$ .......................... G06F 12/00; G06F 13/00
(52) U.S. Cl. ................. 711/118; 711/112; 711/159; 714/6; 714/52; 714/53
(58) Field of Search ........................ 711/112, 118, 711/145, 154, 159; 714/6, 25, 48–54; 710/22

(56) References Cited

U.S. PATENT DOCUMENTS

| | | | |
|---|---|---|---|
| 3,585,378 A | * 6/1971 | Bouricius et al. | 714/805 |
| 5,524,230 A | 6/1996 | Sakaue et al. | 711/103 |
| 5,588,112 A | * 12/1996 | Dearth et al. | 714/9 |
| 5,627,783 A | 5/1997 | Miyauchi | 365/185.33 |
| 5,630,093 A | 5/1997 | Holzhammer et al. | 711/115 |
| 5,734,816 A | * 3/1998 | Niijima et al. | 714/8 |
| 5,737,744 A | * 4/1998 | Callison et al. | 711/114 |
| 5,809,228 A | * 9/1998 | Langendorf et al. | 714/53 |
| 5,887,164 A | 3/1999 | Gupta | 713/2 |
| 5,890,209 A | 3/1999 | Dobbek | 711/112 |
| 6,496,878 B1 | * 12/2002 | Azevedo et al. | 710/22 |

FOREIGN PATENT DOCUMENTS

JP            1173716            3/1999

OTHER PUBLICATIONS

B. Mellish et al., "Implementing ESS Copy Services on UNIX and Windows NT", IBM, International Technical Support Organization, SG24–5757–00, Chaps. 3, 4, and Appendix B, Apr. 7, 2000.

* cited by examiner

Primary Examiner—Reginald G. Bragdon
Assistant Examiner—Pierre M. Vital
(74) Attorney, Agent, or Firm—Konrad Raynes & Victor LLP

(57) ABSTRACT

Disclosed is a method, system, program, and data structures for transferring data to a requesting application. A request is received for one or more blocks of data at contiguous addresses in a storage device. Each block of data includes customer data and metadata indicating the address of the block in the storage device and an error checking code that is capable of being used to determine whether the customer data in the block has changed. For each requested block, a determination is made as to whether the address of the block of data in the metadata and the requested address match. Further, for each requested block, an operation is performed on the customer data in the block and the error checking code to determine whether the customer data has changed. The requested block is transferred to the requesting application if the address of the block in the metadata and requested address match and the customer data has not changed.

37 Claims, 9 Drawing Sheets

| Hardware Control Block | |
|---|---|
| Byte | Field |
| 0-5 | Target PA |
| 0 - 1 | Disk ID |
| 2 - 5 | LBA |
| 6-7 | Reserved for processor |
| 8-23 | Reserved for I/O Manager |
| 24-25 | Controls |
| Bits 0 - 9 | Reserved |
| Bit 10 | Recalculate LRC after Target PA is added and add LRC |
| Bit 11 | Add target PA; use the target PA. The LBA is used for the first transferred sector. Increment the LBA for subsequent transferred sector. |
| Bit 12 | Check LRC |
| Bit 13 | Check PA. Use the source PA. LBA must match first transferred sector. Increment the LBA for subsequent transferred sector. |
| Bits 14 - 15 | Address Conversion:<br>00 - 512 cache to 512 host<br>01 - 512 host to 520 cache<br>10 - 520 cache to 512 disk<br>11 - 520 cache/disk |
| 26-31 | Source PA |
| 26-27 | Disk ID |
| 28-31 | LBA |

50

| Hardware Control Block | |
|---|---|
| Byte | Field |
| <u>0-5</u><br>0 - 1<br>2 - 5 | <u>Target PA</u><br>Disk ID<br>LBA |
| 6-7 | Reserved for processor |
| 8-23 | Reserved for I/O Manager |
| <u>24-25</u><br>Bits 0 - 9 | <u>Controls</u><br>Reserved |
| Bit 10 | Recalculate LRC after Target PA is added and add LRC |
| Bit 11 | Add target PA; use the target PA. The LBA is used for the first transferred sector. Increment the LBA for subsequent transferred sector. |
| Bit 12 | Check LRC |
| Bit 13 | Check PA. Use the source PA. LBA must match first transferred sector. Increment the LBA for subsequent transferred sector. |
| Bits 14 - 15 | Address Conversion:<br>   00 - 512 cache to 512 host<br>   01 - 512 host to 520 cache<br>   10 - 520 cache to 512 disk<br>   11 - 520 cache/disk |
| <u>26-31</u><br>26-27<br>28-31 | <u>Source PA</u><br>Disk ID<br>LBA |

FIG. 2

| ADDRESS FORMAT | |
|---|---|
| Bit Offset | Field Description |
| 63 | Reserved |
| 62 | Hardware Control Block enabled (0 - do not use HCB; 1 - use HCB index |
| 61-64 | Hardware Control Block Index. |
| 43-33 | Reserved |
| 32-0 | Memory Address |

FIG. 3

METHOD, SYSTEM, AND DATA STRUCTURES FOR TRANSFERRING BLOCKS OF DATA FROM A STORAGE DEVICE TO A REQUESTING APPLICATION

CROSS-REFERENCE TO RELATED APPLICATIONS

This application is related to the following co-pending and commonly-assigned patent application entitled "Method, System, And Data Structures for Using Metadata in Updating Data in a Storage Device" to Robert L. Morton, David k Burton, Koji Nakase, and Norio Fujita, having application Ser. No. 09/630,228, which is filed on the same date herewith and all of which is incorporated herein by reference in its entirety.

BACKGROUND OF THE INVENTION

1. Field of the Invention

The present invention relates to a system, method, and program for transferring data from a storage device to a requesting application.

2. Description of the Related Art

Many organizations demand high, constant availability of data and also desire data protection in the form of a backup, mirror copy of data. While data is being backed-up, access to the data may be unavailable. For this reason, it is important to provide a backup system that minimizes the time during which access to the data is unavailable. To satisfy such demands, IBM provides the Flash Copy procedure that provides an instantaneous point-in-time copy of a logical volume.

A Flash Copy operation involves creating a relationship between source and target volumes, where the target maintains the copy as of a point-in-time. As part of establishing the relationship, a data structure is created of the source volume. The data structure may comprise a bitmap of the source volume tracks or some other data structure. After the data structure is created, access to the source and target volumes subject to the Flash Copy may be resumed. Thus, read/write access to the source and target volumes is only blocked for the short time needed to create the data structure and establish a relationship between source and target volumes. At the time the data structure is created, the target volume is empty. A background operation then begins copying the tracks in the source volumes identified in the data structure to the corresponding target volumes. The data structure indicates which tracks in the source were copied over to the target.

If an application requests data from the target that has not yet been updated with the source data, then the data is read from the source; otherwise, the read can be satisfied from the target volume. Before an application can update a track on the source that has not yet been copied, the track is copied to the target volume. Subsequent reads to this track on the target volume are satisfied from the target volume. After some time, all tracks will have been copied to the target volume, and the Flash Copy relationship will end. If an application wants to update the target before the source data has been copied to the target, the data is first read from the source, written to the target, then updated by the application. The target volumes's bitmap is updated to indicate that the copy has been made. Further details of the Flash Copy operation are described in the IBM publication entitled "Implementing ESS Copy Services on UNIX and Windows NT," having IBM document no. SG24-5757-00 (Copyright IBM Corp., April, 2000), which publication is incorporated herein by reference in its entirety.

Many storage systems utilize a storage controller that controls access to a storage device that consists of numerous interconnected hard disk drives, such as a Direct Access Storage Device (DASD). When transferring data from a location, such as a source or target location, in the DASD to an application program at a host computer or writing data from the application to the DASD, the data sectors in the DASD are typically maintained in a cache device, such as a non-volatile storage unit.

There is a need in the art to ensure that data being transferred from a DASD location or cache during a read/write operation has not been corrupted or inadvertently altered by another process. Further, there is a need to provide for the checking of requested target blocks in a Flash Copy relationship when the source data has not yet been copied to the target blocks.

SUMMARY OF THE PREFERRED EMBODIMENTS

To overcome the limitations in the prior art described above, preferred embodiments disclose a method, system, program, and data structures for transferring data to a requesting application. A request is received for one or more blocks of data at contiguous addresses in a storage device. Each block of data includes customer data and metadata indicating the address of the block in the storage device and an error checking code that is capable of being used to determine whether the customer data in the block has changed. For each requested block, a determination is made as to whether the address of the block of data in the metadata and the requested address match. Further, for each requested block, an operation is performed on the customer data in the block and the error checking code to determine whether the customer data has changed. The requested block is transferred to the requesting application if the address of the block in the metadata and requested address match and the customer data has not changed.

In further embodiments, a control block is set-up indicating the block address of a first requested block at the first address of the requested contiguous addresses and whether to check the address and error code of the block. In such case, determining whether the block address in the metadata and the requested address match comprises using the block address in the control block as the requested address to compare with the block address in the metadata. For each requested block, the block address is incremented in the control block before processing a next block. In this way, the incremented block address is used as the requested address to compare with the block address in the metadata for the next requested block.

In yet further embodiments, indicating the block address in the control block comprises indicating a target address of a block having a corresponding source block that as not yet been copied to the block at the target address. In such case, transferring the requested block comprises transferring the customer data in the block at the source address.

In still further embodiments, the steps of determining whether the address of the block and block address in metadata match and performing the operation on the customer data and error checking is performed by a device that is separate from a main processor. This allows the transfer of the block of data from the storage device to the requesting application using a direct memory access (DMA) channel.

Still further, the requested blocks at contiguous addresses may comprise target blocks at contiguous target addresses in a copy relationship with source blocks at contiguous source addresses that have not yet been copied to the target blocks. In such case, the customer data and metadata in the block at the source address in the storage device to be copied to the requested target block are transferred to the cache. The block address in the metadata in the cache is replaced with the requested target address before determining whether the address of the block of data in the metadata in the cache and the requested target address match.

Preferred embodiments provide a technique for transferring data to a requesting application that utilizes metadata to ensure that the data being transferred is from the correct location in the storage device and that the data has not been changed while in the storage device. Further, preferred embodiments may be used when responding to a request for a target block address that is in a copy relationship, such as a Flash Copy relationship, with a source block address that has not yet been updated to the target block address. The preferred embodiments allow for the checking of data before transfer to the requesting application to ensure that the data has not been inadvertently overwritten or corrupted.

Further, the preferred embodiment use of metadata with the block of data may apply to data staged into cache before returning the data from the cache to the requesting application. The metadata in cache can be used to ensure that the requested data has not been inadvertently overwritten or corrupted while in cache pending transfer to the requesting application.

BRIEF DESCRIPTION OF THE DRAWINGS

Referring now to the drawings in which like reference numbers represent corresponding parts throughout:

FIGS. 2 and 3 illustrates data structures used to perform input/output (I/O) operation with respect to a storage device in accordance with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
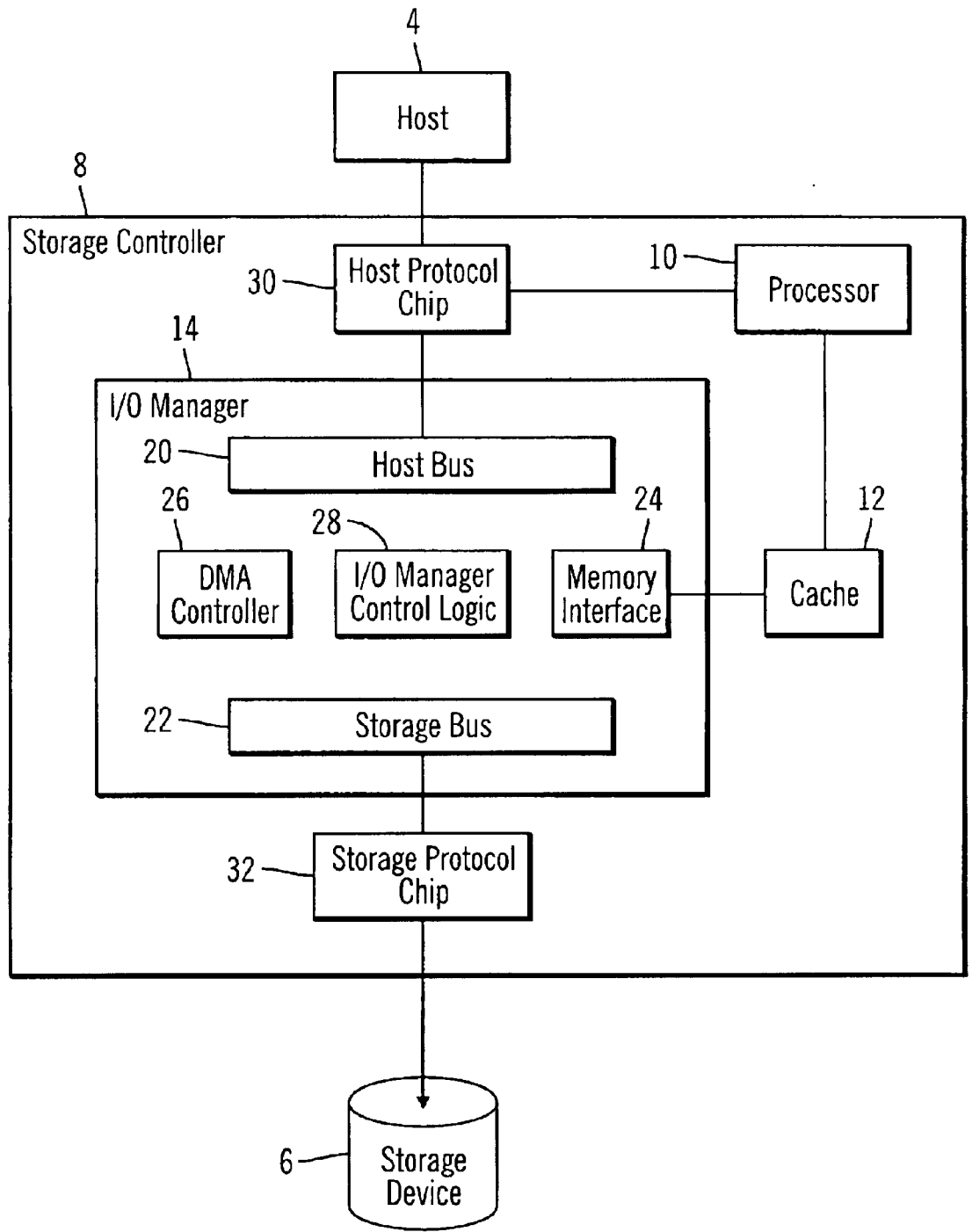
FIG. 1 is a block diagram illustrating a computing environment in which preferred embodiments are implemented.

FIG. 1 illustrates a computing environment in which preferred embodiments are implemented. A host 4 may comprise any computing device known in the art, including servers through which other client computers can access storage or clients. The host 4 includes at least one adaptor, such as a Fibre Channel or Small Computer System Interface (SCSI) adaptor card or any other network adaptor card known in the art. The host adaptors allow the host to communicate with a storage device 6 via a storage controller 8. The storage device 6 may comprise a DASD or any other non-volatile storage device and system known in the art, including hard disk drives, tape storage, optical disks, etc. The storage controller 8 may comprise any control unit, storage controller, etc. that manages the transfer of data from an I/O device, such as storage device 6, and one or more hosts.

In preferred embodiments, the storage controller 8 controller includes a main processor 10, a cache 12, and an I/O manager 14. In preferred embodiments, the I/O manager 14 comprises a separate integrated circuit device that manages the transfer of data between the storage device 6 and host 4. In preferred embodiments, data is transferred among the host 4, cache 12, and storage device 6 via the I/O manager 14 without requiring the processor 10 to be involved in the data movement operations. In this way, the processor 10 is relieved of having to directly manage the data transfer operations, thereby improving overall storage controller 8 performance. This arrangement relieves the main processor 10 from the otherwise substantially burdensome activity of directly controlling the transfer of data and updating the metadata in cache after transferring data.

The I/O manager 14 includes a host bus 20 for interfacing with host 4 systems; a storage bus 22 for interfacing with the storage device 6; a memory interface 24 for interfacing with the cache 12; a Direct Memory Access (DMA) controller 26 to manage DMA channels providing direct communication from the cache 12 to the storage device 6 that entirely bypasses the main processor 10 of the storage controller 8; and an I/O manager control logic 28 to perform the various I/O manager 14 operations, including logic to transfer data among the cache 12, host 4 and storage device 6, logic to XOR data as part of longitudinal redundancy error checking (LRC), and formatting sectors of data. The DMA controller 26 in the I/O manager 14 is used to access data in the cache 12 and provide the data to an XOR engine to perform the error checking and generate the LRC error checking code.

A host protocol chip 30 provides for the data transfer protocol processing, such as SCSI or Fibre Channel protocol, to move data between the I/O manager 14 and host 4. A storage protocol chip 32 provides for data transfer protocol processing between the I/O manager 14 and the storage device 6. The host 30 and storage 32 protocol chips would each include a DMA controller to transfer data along DMA channels between the host 4 and cache 12 and cache 12 and storage 6 without involving the storage controller 8 main processor 10.

In preferred embodiments, the processor 10, cache 12, I/O manager 14, and protocol chips 30 and 32 are all on the same controller card or board. In alternative embodiments, any one or more of these components may be on separate cards all within the storage controller 8.

In preferred embodiments, the I/O manager 14 encodes sectors of data being transferred among the host 4, storage device 6, and cache 12 with an eight byte physical address identifying the volume and logical block address (LBA) of the sector and a two byte LRC code formed by XORing the customer data and physical address (PA) in the sector. The physical address (PA) may comprise a logical address that is further processed to obtain the physical location of the data. In preferred embodiments, each data sector or sector of customer data comprises 512 bytes. Thus, the format of the data sector maintained by the I/O manager 14 may be as follows: bytes 0–511 include the customer data; bytes 512–517 include the physical address of the sector in the storage device 6; and bytes 518–519 includes the LRC code.

In the described embodiments, data from the host 4 being written to the storage device 6 is first placed in cache 12. In this way, the host 4 does not have to wait for the storage controller 8 to complete the update to the storage device 6 in order to proceed as the updates are applied to cache 12 and then later destaged to the storage device 6. Thus, the performance of the host 4 update is not dependent on the speed of the storage device 6 and storage controller 8. Data being read by the host 4 from the storage device 6 is also placed in cache 12 to allow subsequent requests to the same data to be serviced from cache 12, which is faster than returning data from the storage device 6.

For a Flash Copy operation, if writing to a source sector having data that has not yet been copied to the target, the source sector subject to the update must first be copied to the corresponding target sectors before overwriting the source data. Similarly, if reading a target sector that has not yet been updated with the source data, the storage controller 8 must provide the source data before reading the target data.

The physical address (PA) and LRC fields in the 520 byte sector are generated by the I/O manager 14 when the updates are written into cache 12 from the host 4 or when the sector in the storage device 6 staged into cache 12 does not include the eight bytes of metadata. In certain embodiments, the eight bytes of metadata may be stored with the sector written to the storage device 6. The I/O manager 14 checks the physical address and LRC fields in the eight bytes of metadata whenever data is staged into cache, transferred from cache to the host 4, and transferred from the host to cache 12.

To initialize a data transfer operation, the processor 10 would first set-up a hardware control block in the cache 12 for the I/O manager to use 14 when determining how to process data transferring among the host 4, storage device 6, and cache 12. FIG. 2 illustrates the fields in the hardware control block 50. The bytes for the target physical address (PA) (bytes 0–5) and source physical address (PA) (bytes 26–31) are both used if the operation is to read data from a target sector or write data to a source or target sector(s) involved in a Flash Copy relationship when the source data has not yet been copied over to the target data, as indicated in the bitmap discussed above. In such case, the source sector must be copied to the cache 12 as the target sector. The physical address (PA) of the source and target sectors involved in the operation are maintained in the target PA and source PA fields in the hardware control block. If the operation is a write, then target physical address (PA), bytes 0–5, is used when the update is read from the host 4 and written to the cache 12. The source physical address (PA) (bytes 26–31) is used when the update is read from the cache 12 and then written to the storage device 6. For a non-Flash Copy read operation, the source physical address is used (PA) for both the transfer from the storage device 6 to cache 12 and from the cache 12 to the host 4. However, if sectors in the storage device 6 are in a 512 byte format, then the target physical address is used when staging the sector from the storage device 6 to the cache 12, and the target physical address is used to transfer the data from the cache 12 to the host.

The controls field (bytes 24–25) provide bits that the processor 10 sets to instruct the I/O manager 14 on how to process data being transferred among the host 4, storage device 6, and cache 12. Bits 10, 11, 12, and 13 are set when there is a Flash Copy relationship between source and target sectors. If the host 4 is trying to read a target sector involved in a Flash Copy relationship that has not yet been updated with the source sector, then the I/O manager copies the data from the source sector into cache. The I/O manager 14 checks the source physical address (PA) in the metadata of the sector staged into cache with the source physical address (PA) in the hardware control block (HCB). The I/O manager 14 would further perform an LRC XOR operation on the 518 sector bytes, including the 512 bytes of customer data and six byte physical address, staged into cache and check with the two byte LRC code in the metadata.

After the staged in source sector is verified, the I/O manager 14 would replace the source physical address (PA) in the metadata in cache 12 with the requested target physical address (PA), thereby making the sector in cache 12 the target sector. To accomplish this, Bits 10 and 11 are set to "on" to instruct the I/O manager control logic 28 to add the target physical address (PA) to the sector staged into cache 12 from the storage device 6. Bit 10 instructs the I/O manager control logic 28 to recalculate the LRC after staging the source sector into cache 12 for the metadata of the corresponding target sector being built in cache 12. Bit 12 is set to instruct the I/O manager 14 to check the LRC of the data in cache. Bit 13 is set regardless of whether there is a Flash Copy relationship to check the physical address (PA) in the metadata with the requested physical address when staging the source sector into cache 12. Bits 14–15 indicate the sector format acceptable to the cache and disk and cache and host to allow for formatting of the sector to ensure compatibility.

"00" indicates that 512 bytes are transferred from cache 12 to the host 4, with no formatting changes. In this case, no metadata is maintained with the 512 byte sector in cache 12.

"01" indicates that a 512 byte sector from the host 4 is converted to a 520 byte sector in cache 12, where eight bytes include the metadata, i.e., physical address and LRC code for the 512 bytes of data.

"10" indicates that a 520 byte sector from the cache 12 is converted to a 512 byte sector for the disk or storage device 6, thereby stripping the sector of the metadata in cache before storing on disk. In this case, the disk does not maintain the metadata.

"11" indicates that a 520 byte sector in cache 12 is to be sent without conversion to the storage device 6 as the storage device maintains the eight bytes of metadata.

The processor 10 also sets-up fields in a DMA address 60 having the address format shown in FIG. 3 to provide information on how to transfer sectors in the storage device 6 to the cache 12 and from the cache 12 to the host 4. This DMA address 60 is used by the storage protocol chip 32 to DMA sectors from the storage device 6 into cache 12. The hardware control block enabled field (bit 62) indicates whether to use the hardware control block index in memory; the hardware control block index (bits 61–64) references the hardware control blocks in memory; and the memory address in cache 12 (bits 32–0) of where to store the first sector in the read request.

Figure 4A:
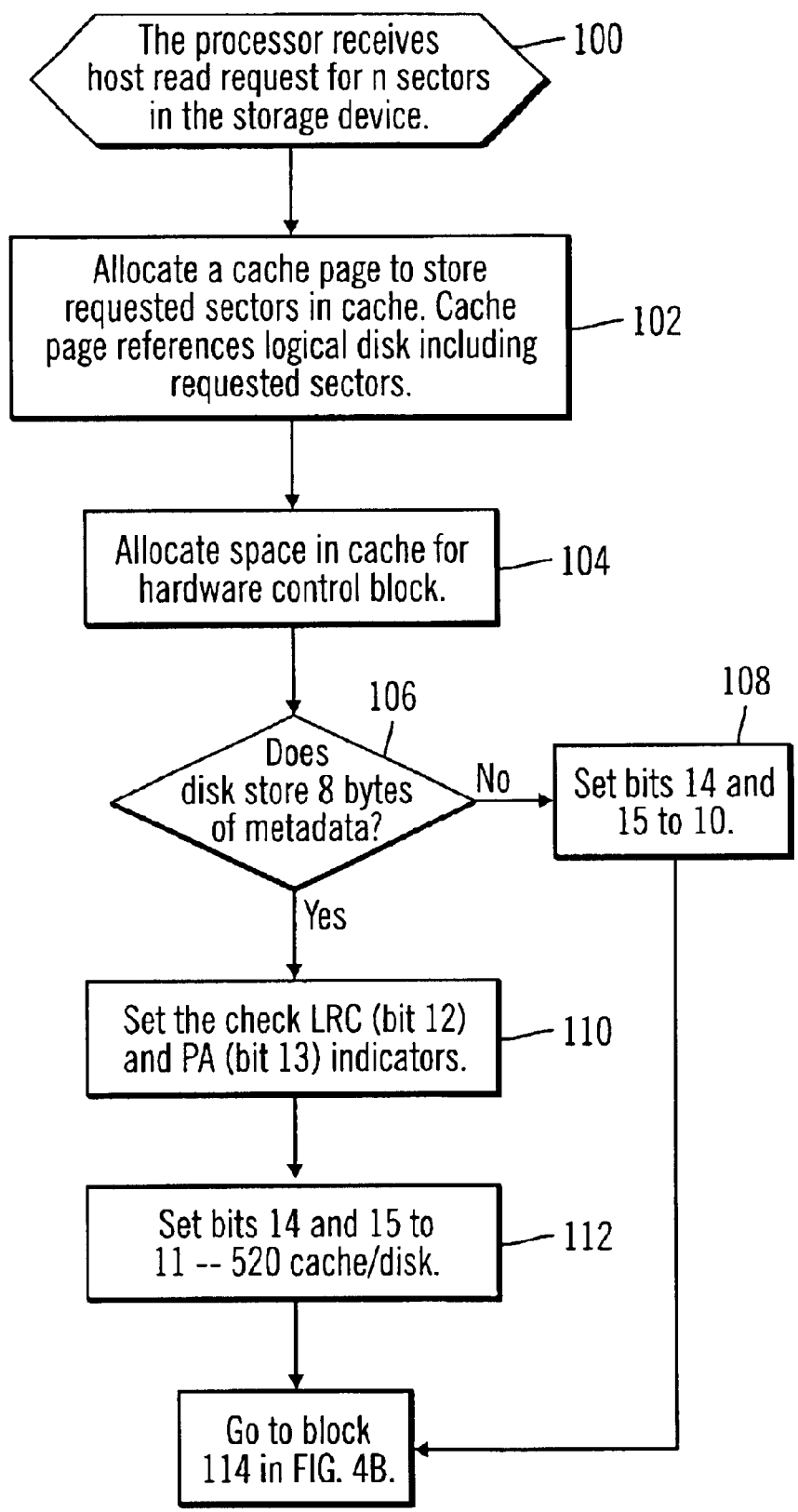
FIGS. 4a, b illustrate logic to set-up a hardware control block to facilitate the I/O operation against the storage device in accordance with preferred embodiments of the present invention.

FIGS. 4a, b illustrate logic implemented in the firmware or software of the processor 10 to set-up the hardware control block (HCB) of FIG. 2 in cache 12 and the fields in the DMA address of FIG. 3 for a read request received by the host protocol chip 10 from the host 4 at block 100. In preferred embodiments, the host protocol chip 30 would send the read request to the processor 10 to initially process. In response to the read request, the processor 10 allocates (at block 102) a page in cache 12 to store the requested sector(s). This cache page references the logical disk including the requested sectors. The processor 10 further allocates (at block 104) a hardware control block (HCB) for the requested n sectors in cache. If (at block 106) the storage device 6, e.g., disk, does not store the eight bytes of metadata (physical address and LRC), then the processor 10 sets (at block 108) the address conversion bits 14–15 in the hardware control block (HCB) to "10", indicating that the storage device 6 only stores the 512 bytes of data. Otherwise, if the storage device 6 stores the eight bytes of metadata, then the processor 10 sets (at block 110) the check LRC (bit 12) and check physical address (PA) (bit 13) bits are set to "on" to provide for checking of the physical address and LRC when staging the data into cache 12. Bits 14–15 (at block 112) are set to "11" indicating that both the cache 12 and storage device 6 store the full 520 byte sectors of customer data and metadata.

Figure 4B:
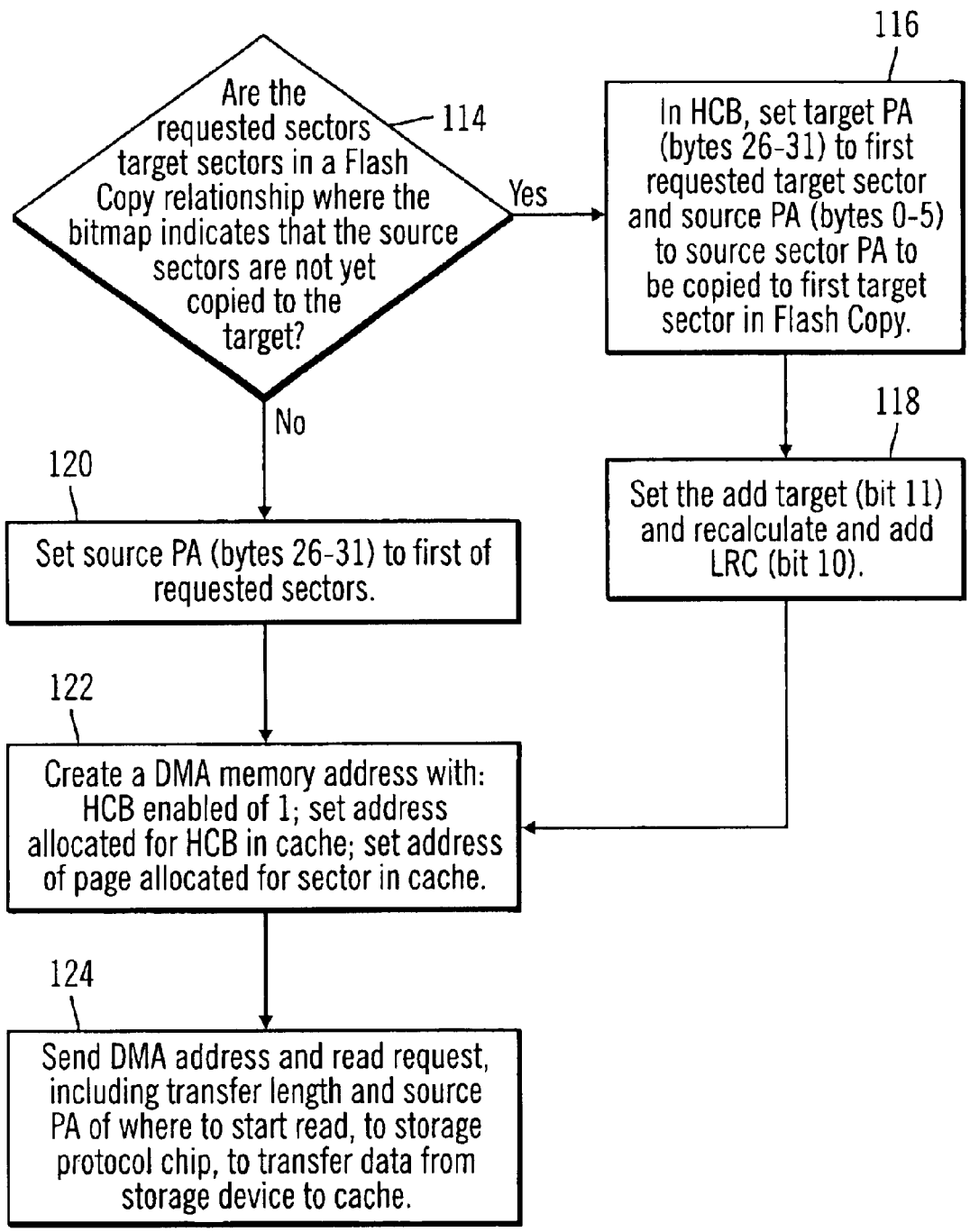

From blocks 108 or 112, control transfers to block 114 in FIG. 4b where the processor 10 determines whether the requested sector(s) are target sector(s) in a Flash Copy relationship and, if so, whether the source sectors in the Flash Copy relationship have not yet been copied over to the requested target sectors. If (at block 114) the source sectors have not yet been copied to the requested target sectors, then the processor 10 sets (at block 116) the target physical address (PA) at bytes 0–5 in the hardware control block (HCB) to the first requested target sector and the source physical address (PA) at bytes 26–31 to the source sector to be copied to the first requested target sector. The processor 10 further sets (at block 118) the add target bit (bit 11) and recalculate LRC bit (bit 10) to change the metadata for the source sector copied to cache 12 to metadata for the requested target sector by changing the physical address (PA) and LRC maintained in the metadata in cache 12. Otherwise, if (at block 114) the requested sector(s) are not in a Flash Copy relationship or, if in a Flash Copy relationship, the requested sector(s) are source sector(s) or target sector(s) already updated with the source sector(s), then the processor 10 sets (at block 120) the source physical address (PA) at bytes 26–31 in the hardware control block (HCB) to the first requested sector.

From blocks 118 or 120, the processor 10 creates (at block 122) a DMA memory address with the hardware control block (HCB) enabled bit on, the hardware control block index providing an index into the hardware control block (HCB) in cache 12, and the memory address in cache 12 where the first sector in the read request is cached. The processor 10 then transfers (at block 124) the DMA address and a read request including the source physical address (PA) as the start of the read operation having a transfer length equal to the number of requested sectors to the storage protocol chip 32 to use to DMA the requested sectors into cache 12. Note that if the storage device 6 stores sectors in the same format as the host 4, e.g., 512 bytes, then the logical block size (LBA) is 512. Otherwise, if the storage device 6 stores 520 byte sectors including the eight bytes of metadata, then the LBA size of sectors in the storage device 6 is 520 bytes.

Figure 5:
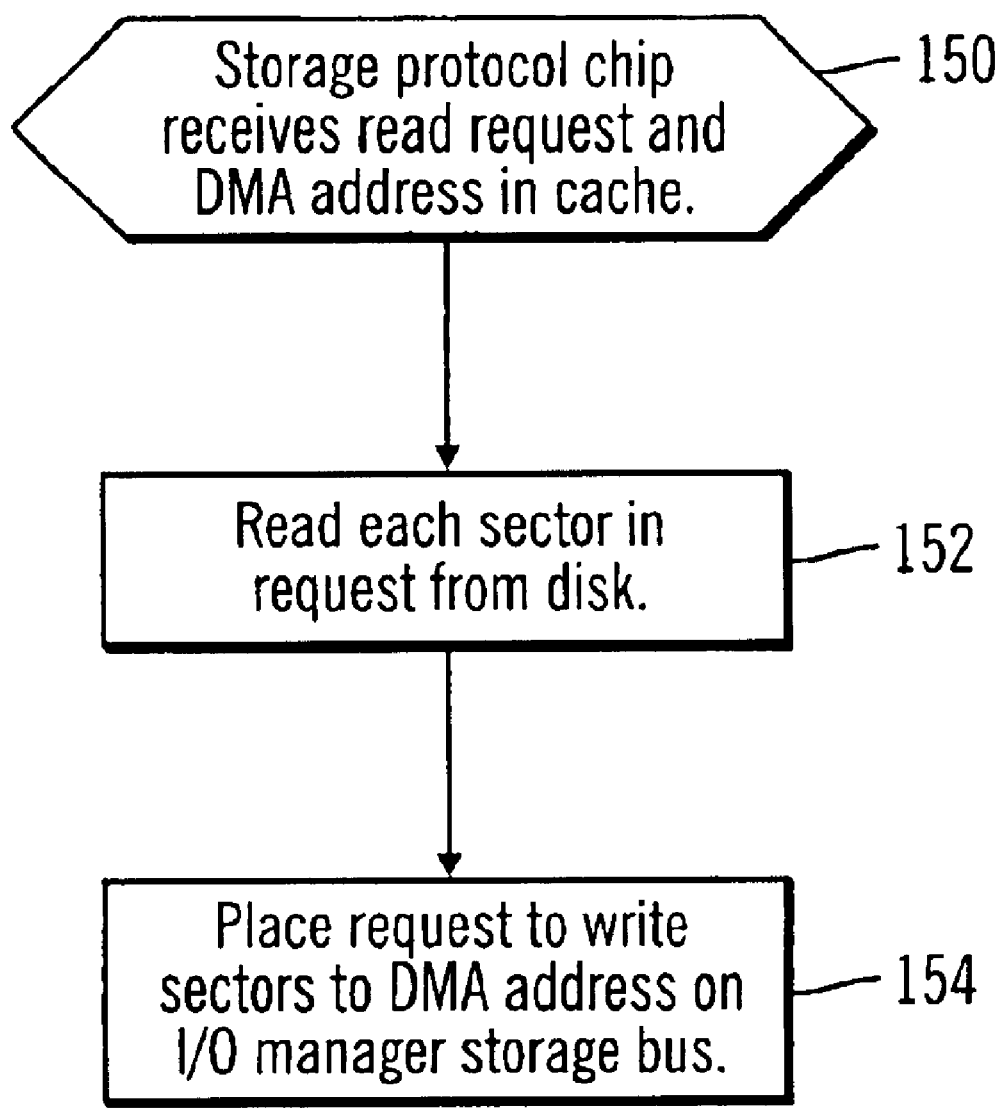
FIG. 5 illustrates logic to ready the transfer data from the storage device to cache in accordance with preferred embodiments of the present invention.

FIG. 5 illustrates logic implemented in the storage protocol chip 32 to DMA the requested sector(s) into cache 12. At block 150, the storage protocol chip 32 receives the DMA address and read request to read n sectors or logical blocks from the source physical address (PA), where n is equal to the transfer length of the read request. The storage protocol chip 32 then executes the read request against the storage device 6 to read (at block 152) the 520 byte sectors. The storage protocol chip 32 then (at block 154) sends a write request to the storage bus 22 to write the read 520 byte sectors to the cache 12 starting at the memory address (bytes 32–0) in the DMA address.

Figure 6:
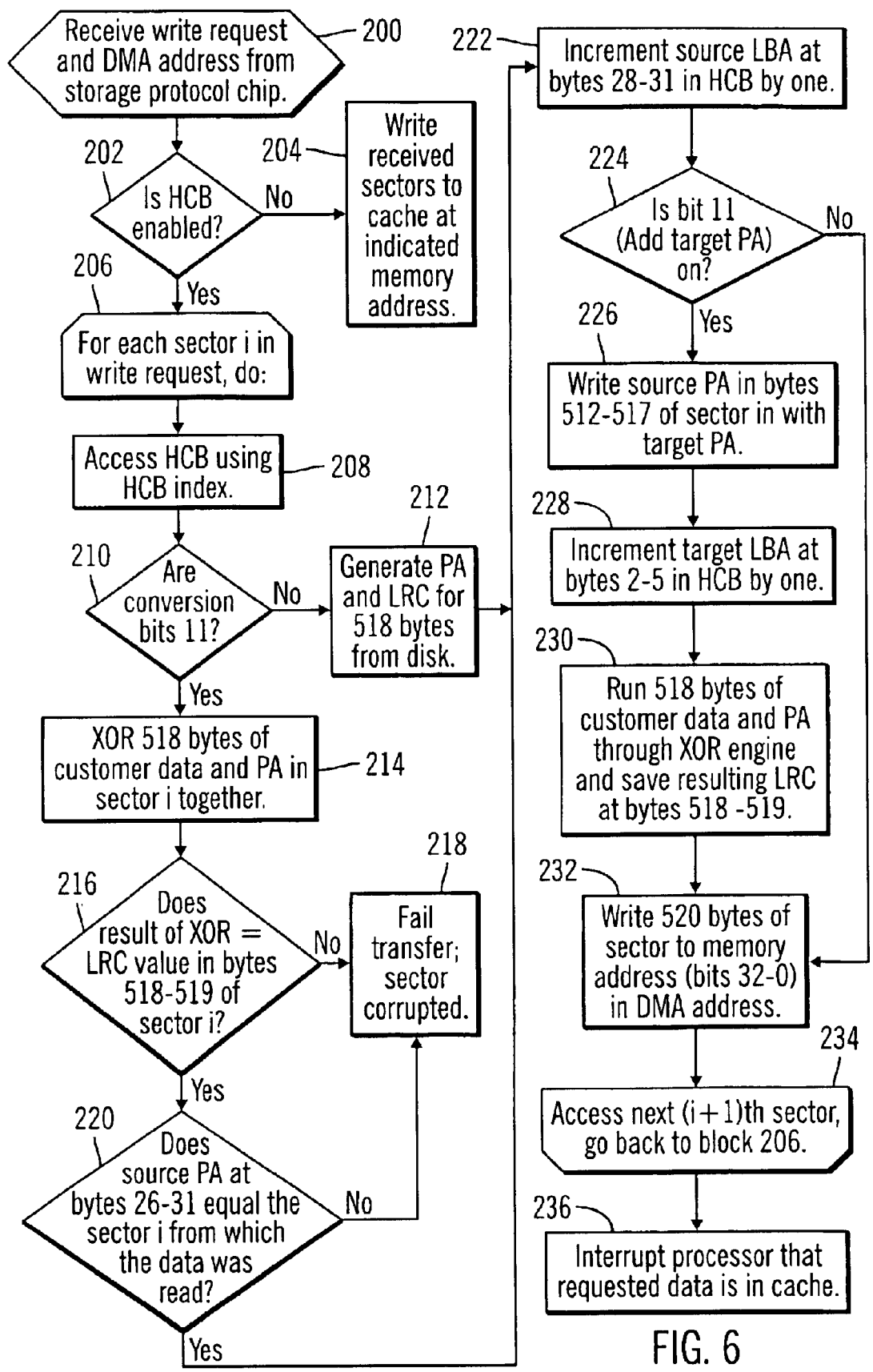
FIG. 6 illustrates logic to use the hardware control block set-up in FIGS. 4a, b to transfer data from the storage device to cache in accordance with preferred embodiments of the present invention.

FIG. 6 illustrates logic implemented in the I/O manager control logic 28 to process a write request from the storage protocol chip 32 to write the sectors read from the storage device 6 to the memory address in cache 12 provided at bits 32–0 in the DMA address. The transfer length of the write request would comprise the number of requested sectors. Upon receiving the write request including the DMA address (at block 200), the I/O manager 14 would determine (at block 202) whether the hardware control block (HCB) is enabled. If not, then the I/O manager 14 would write (at block 204) the received sectors to the cache 12 starting at the cache memory address in the DMA address. Otherwise, the I/O manager 14 would start a loop between blocks 206 and 234 for each sector received from the storage protocol chip 32 to write to cache 12. Within this loop, at block 208, the I/O manager 14 accesses the hardware control block (HCB) using the hardware control block (HCB) index in the DMA address. If (at block 210) the conversion format bits are "11", indicating that both the cache 12 and storage device 6 store 520 byte sectors including the eight bytes of metadata, then the I/O manager 14 proceeds to block 214 to use the metadata to check sector i being staged into cache 12. Otherwise, if the format conversion bits are not "11", indicating that the storage device 6 does not store the metadata, then control proceeds to block 212 to generate the physical address (PA) and LRC code for the data from the storage device 6 to store in the cache with the 512 byte sector.

If the format conversion bits are "11", then at block 214, the I/O manager 14 XORs the first 512 bytes of customer data and six physical address bytes for sector i. If (at block 216) the result of the XOR operation does not equal the two LRC bytes in the metadata, then the I/O manager 14 fails (at block 218) the transfer to cache 12 as the 512 bytes of data have changed since the LRC was last calculated, indicating the sector was corrupted or inadvertently overwritten while in the storage device 6. Otherwise, if the customer data and physical address have not changed, then the I/O manager 14 determines (at block 220) whether the source physical address (PA) at bytes 26–31 in the hardware control block (HCB) equals the physical address (PA) in the metadata of the 520 byte sector i read from the storage device 6. If the physical addresses do not match, then the transfer is failed (at block 218). Otherwise, if the compared physical addresses match, then the I/O manager 14 increments (at block 222) the LBA bytes 28–31 in the source physical address (PA) of the hardware control block (HCB) for the next (i+1)th sector to stage into cache. In this way, the processor 10 only has to set up the hardware control block (HCB) once for a host request of contiguous blocks and the I/O manager 14 increments the LBA bytes after processing one sector in the contiguous sectors requested by the host 4.

If (at block 224) bit "11" is on, indicating to add the target physical address to the sector i metadata to make the source sector staged into cache 12 the target sector, then the I/O manager 14 writes (at block 226) the target physical address (PA) at bytes 0–5 in the hardware control block (HCB) to bytes 512–517 of the sector i. The target LBA address at bytes 2–5 in the hardware control block (HCB) is incremented (at block 228) by one to indicate that the next sector in the consecutive requested sectors will be considered. The I/O manager 4 then runs (at block 230) the 512 bytes of customer data and six bytes of the modified physical address at bytes 512–517 from the sector i through an XOR engine to produce an LRC code for the customer data and physical address. The resulting LRC code is then saved at bytes 518–519 of the sector i. The I/O manager 14 then writes (at block 232) the 520 byte sector to the cache address at bits 32–0 of the DMA memory address. If the sector i is not the first sector, then the I/O manager would write the data at an offset of 520 bytes times i to position the 520 bytes of sector i after the block address of the sector previously written to cache 12. If (at block 224), bit 11 is not "on", indicating that the target physical address (PA) is not to be used, then the I/O manager proceeds to block 232 to write the 520 byte sector to the cache 12. If there are further sectors in the requested sectors to consider, then (at block 234), the I/O manager 14 proceeds back to block 206 to consider the next (i+1)th contiguous sector requested by the host 4. After writing all the 520 byte requested contiguous sectors to the cache 12, the I/O manager 14 then signals (at block 236) the processor 10 that all the requested data has been staged into cache 12.

Figure 7:
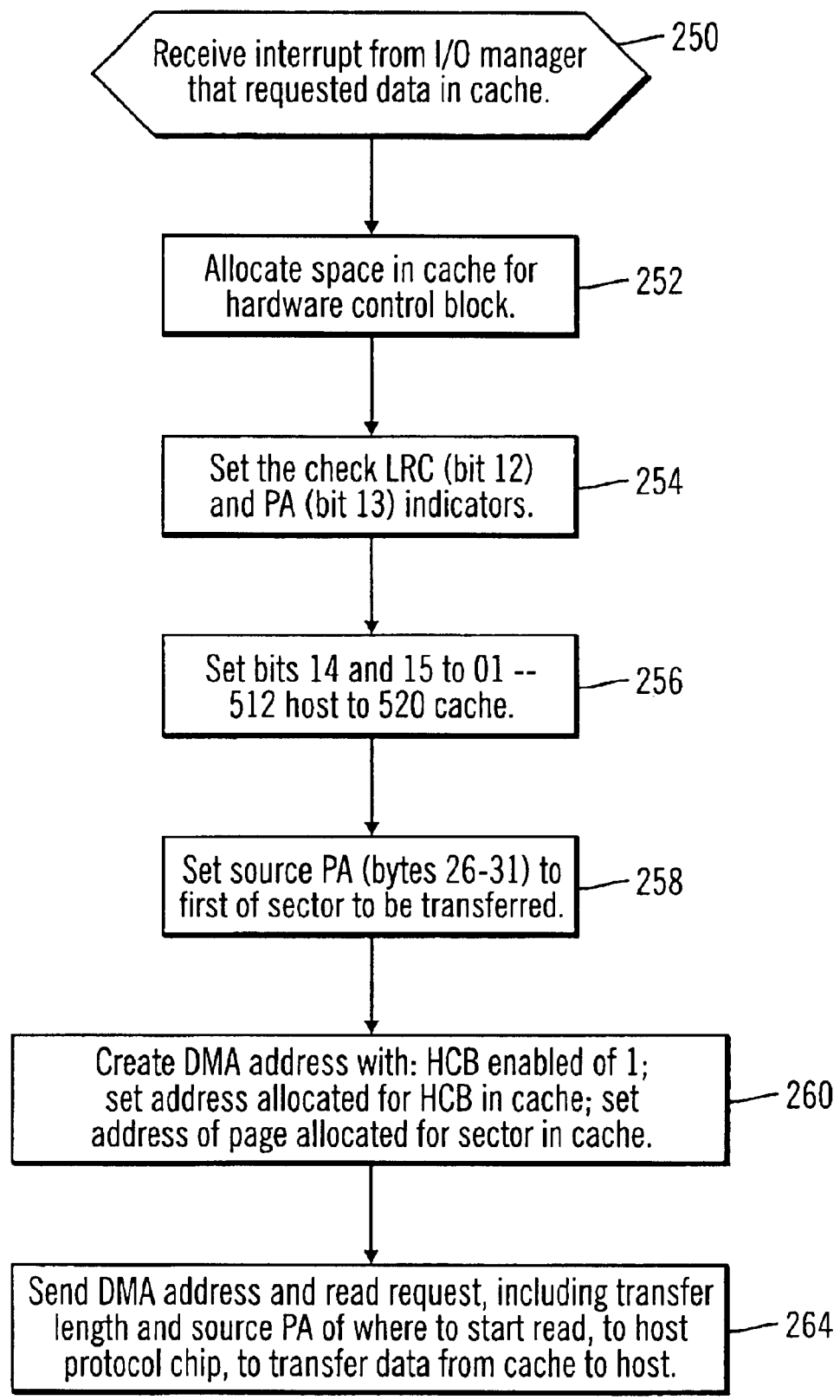
FIG. 7 illustrates logic to set-up an additional hardware control block to facility the transfer of data from the cache to an application requesting the data illustrates logic to ready the transfer data from the storage device to cache in accordance with preferred embodiments of the present invention.

FIG. 7 illustrates logic implemented in firmware or software of the processor 10 to set-up a hardware control block (HCB) and DMA address for use by the I/O manager 14 and host protocol chip 30 to DMA the requested sectors from cache 12 to the host 4, again bypassing the main processor 10. With respect to FIG. 7, control begins at block 250 with the processor 10 receiving the interrupt from the I/O manager 14 that the requested sector(s) were staged into cache 12. In response, the processor 10 allocates (at block 252) space in cache 12 for a new hardware control block (HCB) and sets (at block 254) the check LRC and physical address (PA) bits 12 and 13 "on" to check the data in cache 12 before it is transferred to the host 4. The processor 10 then sets (at block 256) the address conversion bits 14–15 to 01, indicating that the 520 bytes in cache 12 are converted to 512 bytes for the host 4.

The processor 10 then sets (at block 258) the source physical address (PA) bytes 26–31 in the hardware control block (HCB) to the physical address of the first sector to be transferred from the cache 12 to the host 4. The processor 10 further creates (at block 260) a DMA address with the hardware control block enabled to "on"; the hardware control block index indicating the location of the hardware control block for the transfer in cache 12; and the memory address in cache 12 where the first sector in the transfer is located. The processor 10 then transfers (at block 264) a read request starting at the source physical address and having a transfer length equal to the number of requested sectors and the DMA address to the host protocol chip 30.

Figure 8:
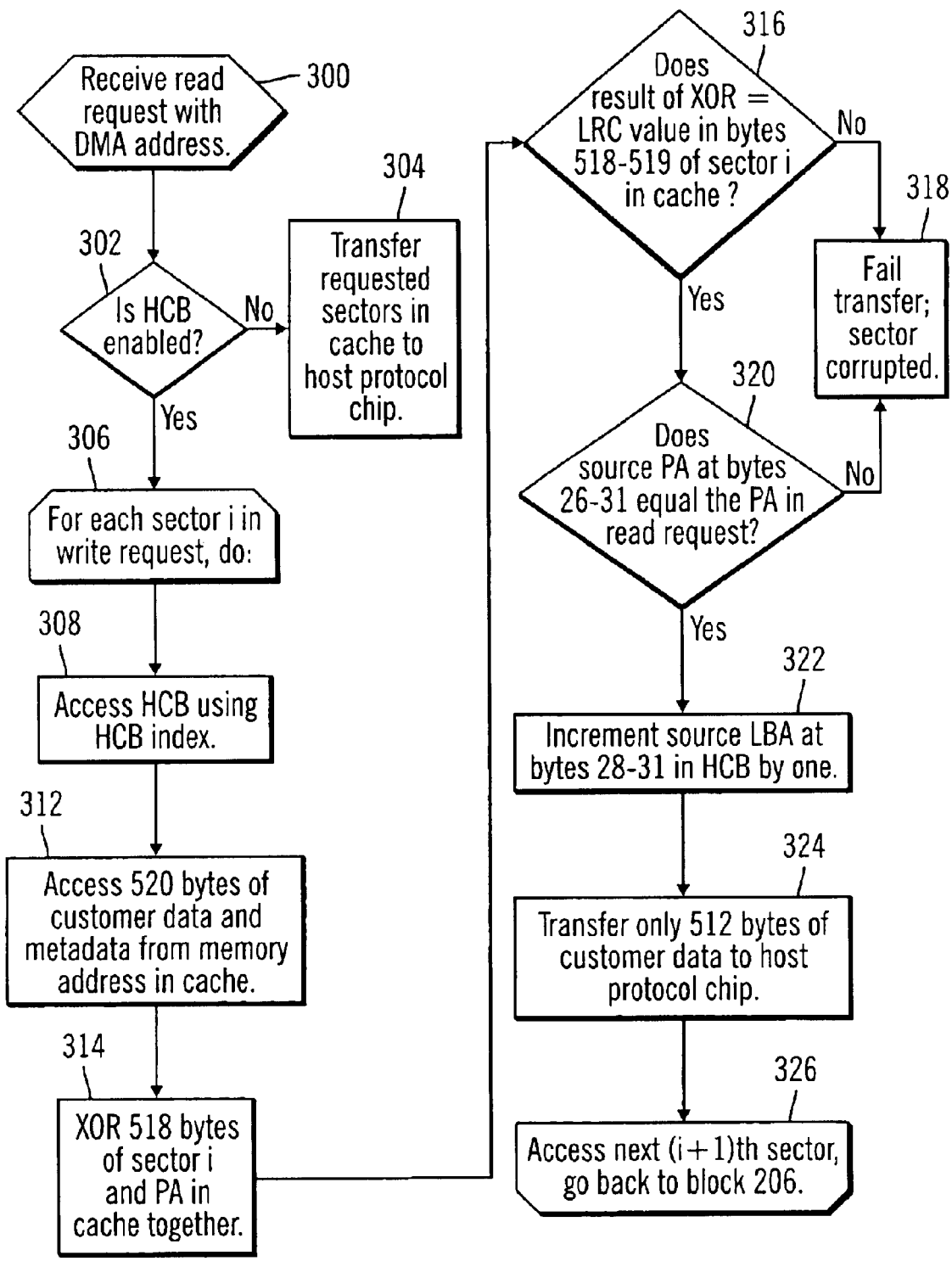
FIG. 8 illustrates logic to use the hardware control block set-up in FIG. 7 to transfer data from the cache to the requesting application in accordance with preferred embodiments of the present invention.

FIG. 8 illustrates logic implemented in the I/O manager 14 to process a read request and DMA address the host protocol chip 30 asserts on the host bus 20. If (at block 302) bit 62 of the DMA address indicates that the hardware control block (HCB) is not enabled, then the I/O manager 14 transfers (at block 304) the sectors in cache 12 at the memory address indicated at bits 32–0 in the DMA address to the host protocol chip 30 to transfer to the host 4. Otherwise, if the hardware control block (HCB) is enabled, then the I/O manager 14 begins a loop at blocks 306 to 326 to transfer the requested sectors from cache 12 to the host protocol chip 30. In this scenario, the address conversion bits 14–15 are "01", indicating to convert the 520 byte sector in the cache 12 to a 512 byte sector for the host 4. If the conversion bits 14–15 were "00", then there would be no metadata maintained in cache 12 for the sector.

Within the loop at block 308, the I/O manager 14 accesses the hardware control block (HCB) using the hardware control block (HCB) index in bits 61–64 of the DMA address. The I/O manager 14 further accesses (at block 312) the 520 bytes of the customer data and metadata from the cache 12. The I/O manager 14 then XORs (at block 314) the 518 bytes of sector data in cache 12 and compares (at block 316) the XOR value with the LRC bytes in the sector. If there is not a match, i.e., the residual is not zero, then the transfer is failed (at block 318). Otherwise if there is a match and the residual is zero, then the I/O manager 14 determines (at block 320) whether the source physical address (PA) at bytes 26–31 in the hardware control block (HCB) is the same as the requested physical address. If so, then the I/O manager 14 increments (at block 322) source LBA at bytes 28–31 in the hardware control block (HCB) by one and transfers (at block 324) only 512 bytes of the customer data to the host 4, as the host does not use the metadata. At block 326, the I/O manager 14 would then access the data for the next (i+1)th sector in cache 12 and go back to block 306 to process the accessed data to check whether the data has been corrupted or inadvertently changed while in cache 12.

Upon receiving the requested data from the I/O manager 14, the host protocol chip 30 then returns the requested sector data to the host 4.

Preferred embodiments provide a technique for maintaining metadata with a sector of data from storage, e.g., disk, to use when transferring data from the storage device to cache and from cache 12 to the host 4 requesting the data. The physical address (PA) and LRC metadata maintained with the sector in the storage device 6 is used to determine whether the data has been inadvertently changed or corrupted while in storage and whether the sector from the storage device staged into the cache is the sector requested by the host 4. Further, the metadata is also used when transferring the requested sector from cache 12 to the host to determine whether the data in cache 12 was inadvertently changed or corrupted while in cache and whether the physical address (PA) of the sector in cache is the same as the requested physical address (PA) indicated in the hardware control block. This checking using the metadata ensures that data returned to the requesting host 4 is correct and has not been corrupted in either the storage device or cache. Thus, the host 4 can be assured that it is receiving the correct data.

Further, with the preferred embodiments, the error checking and data transfer operations are handled by the I/O manager and not the processor. The processor 10 only has to set-up the hardware control block (HCB) and DMA memory address in cache 12, which the I/O manager 14 then uses to perform the error checking and data transfer operations. In this way, processor 10 performance is substantially improved because the processor is not burdened with the substantial processing task of transferring data and updating the metadata in cache, as well as performing the checking operations using the metadata.

Conclusion

The following describes some alternative embodiments for accomplishing the present invention.

The preferred embodiments may be implemented as a method, system, apparatus or program using standard programming and/or engineering techniques to produce software, firmware, hardware, or any combination thereof The control logic for the I/O manager is implemented in logic circuits of an electronic device, such as an integrated circuit device. The control logic that causes the processor to perform various set-up operations is implemented in firmware of the storage controller processor. Further, the host and storage protocol chips are implemented in separate integrated circuit devices. In alternative embodiments, logic described herein as implemented in logic circuits may be implemented in firmware that controls a programmable device, such as a processor. Alternatively, logic described herein as implemented in firmware may be implemented as logic circuitry within an integrated circuit device.

The preferred logic of FIGS. 4–8 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In preferred embodiments, data was transferred in sectors. In alternative embodiments, blocks of data may be transferred in storage units other than sectors.

In the described embodiments, the hardware control block and DMA memory address had particular fields at particular bit and byte locations. In alternative embodiments, different fields may be included in the hardware control block and DMA memory address and the described fields may be located at different byte and bit locations than described in the examples FIGS. 2–3.

Preferred embodiments were described with respect to a storage controller that interfaces between a host and the storage device. In alternative embodiments, the operations performed by the I/O manager and other components, such as the processor 10 and protocol chips 32 may be implemented in a computer system that interfaces with any type of storage device, such as one or more disk drives, a tape drive etc. In such case, the operations performed by the I/O manager 14 and protocol chips 30, 32 may be implemented in one or more hardware components in the computer separate from the main processor. Still further, in alternative embodiments any number of the I/O manager 10 and protocol chip 32 operations may be performed by the processor 10 to check data as it is being transferred form disk to cache and/or from cache to host.

In preferred embodiments, requested data was staged into cache before being transferred to the requesting host. In alternative embodiments, the data from storage may be checked using the metadata and then the customer data portion, i.e., 512 bytes, would be transferred to the requesting host 4.

In preferred embodiments, the requesting application was in a computer system remote from the storage controller. In alternative embodiments, the requesting application may comprise an application program executing in the computer system that performs the I/O manager operations of checking the metadata to determine whether data stored in the storage device and/or in cache has been inadvertently modified or corrupted.

In summary, preferred embodiments disclose a method, system, program, and data structures for transferring data to a requesting application. A request is received for one or more blocks of data at contiguous addresses in a storage device. Each block of data includes customer data and metadata indicating the address of the block in the storage device and an error checking code that is capable of being used to determine whether the customer data in the block has changed. For each requested block, a determination is made as to whether the address of the block of data in the metadata and the requested address match. Further, for each requested block, an operation is performed on the customer data in the block and the error checking code to determine whether the customer data has changed. The requested block is transferred to the requesting application if the address of the block in the metadata and requested address match and the customer data has not changed.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transferring data to a requesting application, comprising:

receiving a request for one or more blocks of data at contiguous addresses in a storage device, wherein each block of data includes customer data and metadata indicating the address of the block in the storage device and an error checking code that is capable of being used to determine whether the customer data in the block has changed;

setting up a control block indicating the block address of a first requested block;

for each requested block, determining whether the address of the block of data in the metadata and the requested address match;

for each requested block, performing an operation on the customer data in the block and the error checking code to determine whether the customer data has changed;

for each requested block, transferring the requested block to the requesting application if the address of the block in the metadata and requested address match and the customer data has not changed; and for each requested block, incrementing the block address in the control block before processing a next block, wherein the incremented block address is used as the requested address to compare with the block address in the metadata for the next requested block.

2. The method of claim 1, wherein the operation performed on the customer data comprises XORing the customer data and wherein the error checking code comprises a longitudinal redundancy checking code.

3. The method of claim 1, wherein the steps of determining whether the address of the block and block address in metadata match and performing the operation on the customer data and error checking is performed by a device that is separate from a main processor to transfer the block of data from the storage device to the requesting application using a direct memory access (DMA) channel.

4. The method of claim 1, further comprising:

transferring each requested block including the customer data and metadata to cache after determining that the block address in the metadata in the storage device and the requested address match and determining that the customer data in the storage device has not changed;

for each requested block, determining whether the address of the block of data in the metadata in the cache and the requested address match;

for each requested block, performing an operation on the customer data in the block in the cache and the error checking code in the metadata in cache to determine whether the customer data in cache has changed, wherein the customer data of the requested block is transferred to the requesting application from the cache if the address of the block in the metadata in cache and the requested address match and the customer data in the cache has not changed.

5. The method of claim 4, further comprising:

setting up a first control block in the cache indicating the block address of a first requested block at the first address of the requested contiguous addresses and whether to check the address and error code of the block, wherein determining whether the block address in the metadata in the storage device and the requested address match comprises using the block address in the first control block in the cache as the requested address to compare with the block address in the metadata in the storage device;

for each requested block, incrementing the block address in the first control block after transferring the block from the storage device to the cache, wherein the incremented block address is used as the requested address to compare with the block address in the metadata for the next requested block; and setting up a second control block in cache indicating the block address of a first requested block at the first address of the requested contiguous addresses and whether to check the address and error code of the block, wherein determining whether the block address in the metadata in the cache and the requested address match comprises using the block address in the second control block in the cache as the requested address to compare with the block address in the metadata in the cache.

6. The method of claim 5, wherein for each requested block, incrementing the block address in the second control block after transferring the block from the cache to the requesting application, wherein the incremented block address is used as the requested address to compare with the block address in the metadata in the cache for the next requested block.

7. The method of claim 1, wherein the error checking code is further capable of being used to determine whether the metadata in the block has changed.

8. A method for transferring data to a requesting application, comprising:

receiving a request for one or more blocks of data at contiguous addresses in a storage device, wherein each block of data includes customer data and metadata indicating the address of the block in the storage device and an error checking code that is capable of being used to determine whether the customer data in the block has changed;

setting up a control block indicating the block address of a first requested block at the first address of the requested contiguous addresses and whether to check the address and error code of the block;

for each requested block:
(i) determining whether the address of the block of data in the metadata and the requested address match by using the block address in the control block as the requested address to compare with the block address in the metadata;
(ii) performing an operation on the customer data in the block and the error checking code to determine whether the customer data bas changed;
(iii) transferring the requested block to the requesting application if the address of the block in the metadata and requested address match and the customer data has not changed; and
(iv) incrementing the block address in the control block before processing a next block, wherein the incremented block address is used as the requested address to compare with the block address in the metadata for the next requested block.

9. The method of claim 8, wherein indicating the block address in the control block comprises indicating a target address of a block having a corresponding source block that bas not yet been copied to the block at the target address, and wherein transferring the requested block comprises transferring the customer data in the block at the source address.

10. A method for transferring data to a requesting application, comprising:

receiving a request for one or more blocks of dot at contiguous addresses in a storage device, wherein each block of data includes customer data and metadata indicating the address of the block in the storage device and an error checking code that is capable of being used to determine whether the customer data in the block has changed, wherein the requested blocks at contiguous addresses comprise target blocks at contiguous target addresses in a copy relationship with source blocks at contiguous source addresses that have not yet been copied to the target blocks;

for each requested block, determining whether the address of the bock of data in the metadata and the requested address match;

for each requested block, performing an operation on the customer data in the block and the error checking code to determine whether the customer data has changed; and for each requested block, transferring the requested block to the requesting application if the address of the block in the metadata and requested address match and the customer data has not changed;

transferring the customer data and metadata in the block at the source address in, the storage device to be copied to the requested target block to the cache; and replacing the block address in the metadata in the cache with the requested target address before determining whether the address of the block of data in the metadata in the cache and the requested target address match.

11. The method of claim 10, further comprising:

recalculating the error code from the customer data in the cache before performing the operation on the customer data in the cache.

12. A system for transferring data to a requesting application, comprising:

means for receiving a request for one or more blocks of data at contiguous addresses in a storage device, wherein each block of data includes customer data and metadata indicating the address of the block in the storage device and an error checking code that is capable of being used to determine whether the customer data in the block has changed;

means for determining for each requested block whether the address of the block of data in the metadata and the requested address match;

means for performing for each requested block an operation on the customer data in the block and the error checking code to determine whether the customer data has changed; and means for transferring the requested block to the requesting application if the address of the block in the metadata and requested address match and the customer data has not changed, wherein the means for transferring performs the transferring for each requested block;

means for setting up a control block indicating the block address of a first requested block; and means for incrementing the block address in the control block before processing a next block, wherein the incremented block address is used as the requested address to compare with the block address in the metadata for the next requested block.

13. The system of claim 12, wherein the operation performed on the customer data comprises XORing the customer data and wherein the error checking code comprises a longitudinal redundancy checking code.

14. The system of claim 12, wherein the means for determining whether the address of the block and block address in metadata match and the means for performing the operation on the customer data and error checking comprises a device that is separate from a main processor and includes means for transferring the block of data from the storage device to the requesting application using a direct memory access (DMA) channel.

15. The system of claim 12, further comprising:

means for transferring each requested block including the customer data and metadata to cache after determining that the block address in the metadata in the storage device and the requested address match and determining that the customer data in the storage device has not changed;

means for determining for each requested block whether the address of the block of data in the metadata in the cache and the requested address match;

means for performing, for each requested block, an operation on the customer data in the block in the cache and the error checking code in the metadata in cache to determine whether the customer data in cache has changed, wherein the customer data of the requested block is transferred to the requesting application from the cache if the address of the block in the metadata in cache and the requested address match and the customer data in the cache has not changed.

16. The system of claim 15, further comprising:

means for setting up a first control block in the cache indicating the block address of a first requested block at the first address of the requested contiguous addresses and whether to check the address and error code of the block, wherein the means for determining whether the block address in the metadata in the storage device and the requested address match comprises using the block address in the first control block in the cache as the requested address to compare with the block address in the metadata in the storage device;

means for incrementing, for each requested block, the block address in the first control block after transferring the block from the storage device to the cache, wherein the incremented block address is used as the requested address to compare with the block address in the metadata for the next requested block; and means for setting up a second control block in cache indicating the block address of a first requested block at the fist address of the requested contiguous addresses and whether to check the address and error code of the block, wherein the means for determining whether the block address in the metadata in the cache and the requested address match uses the block address in the second control block in the cache as the requested address to compare with the block address in the metadata in the cache.

17. The system of claim 16, further comprising means for incrementing, for each requested blocks the block address in the second control block after transferring the block from the cache to the requesting application, wherein the incremented block address is used as the requested address to compare with the block address in the metadata in the cache for the next requested block.

18. The system of claim 12, wherein the error checking code is further capable of being used to determine whether the metadata in the block has changed.

19. A system for transferring data to a requesting application, comprising:

means for receiving a request for one or more blocks of data at contiguous addresses in a storage device, wherein each block of data includes customer data and metadata indicating the address of the block in the storage device and an error checking code that is capable of being used to determine whether the customer data it the block has changed;

means for determining for each requested block whether the address of the block of data in the metadata and the requested address match;

means for performing for each requested block an operation on the customer data in the block and the error checking code to determine whether the customer data has changed;

means for transferring the requested block to the requesting application if the address of the block in the metadata and requested address match and the customer data has not changed, wherein the means for transferring performs the transferring for each requested block;

means for setting up a control block indicating the block address of a first requested block at the first address of the requested contiguous addresses and whether to check the address and error code of the block, wherein the means for determining whether the block address in the metadata and the requested address match uses the block address in the control block as the requested address to compare with the block address in the metadata; and means for incrementing the block address in the control block for each requested block before processing a next block, wherein the incremented block address is used as the requested address to compare with the block address in the metadata for the next requested block.

20. The system of claim 19, wherein indicating the block address in the control block comprises indicating a target address of a block having a corresponding source block that has not yet been copied to the block at the target address, and wherein the means for transferring the requested block transfers the customer data in the block at the source address.

21. A system for transferring data to a requesting application, comprising:

means for receiving a request for one or more blocks of data at contiguous addresses in a storage device, wherein each block of data includes customer data and metadata indicating the address of the block in the storage device and an error checking code that is capable of being used to determine whether the customer data in the block has changed, wherein the requested blocks at contiguous addresses comprise target blocks at contiguous target addresses in a copy relationship with source blocks at contiguous source addresses that have not yet been copied to the target blocks;

means for determining for each requested block whether address of the block of data in the metadata and the requested address match;

means for performing for each requested block operation on the customer data in the block and the error checking code to determine whether the customer data has changed; and means for transferring the requested block to the requesting application if the address of the block in the metadata and requested address match and the customer data has not changed, wherein the means for transferring performs the transferring for each requested block;

means for transferring the customer data and metadata in the block at the source address in the storage device to be copied to the requested target block to the cache; and means for replacing the block address in the metadata in the cache with the requested target address before determining whether the address of the block of data in the metadata in the cache and the requested target address match.

22. The system of claim 21, further comprising:

means for recalculating the error code from the customer data in the cache before performing the operation on the customer data in the cache.

23. An integrated circuit device including logic for transferring data to a requesting application, wherein the logic performs:

receiving a request for one or more blocks of data at contiguous addresses in a storage device, wherein each block of data includes customer data and metadata indicating the address of the block in the storage device and an error checking code that is capable of being used to determine whether the customer data in the block has changed;

setting up a control block indicating the block address of a first requested block;

for each requested block, determining whether the address of the block of data in the metadata and the requested address match;

for each requested block, performing an operation on the customer data in the block and the error checking code to determine whether the customer data has changed; and for each requested block, transferring the requested block to the requesting application if the address of the block in the metadata and requested address match and the customer data has not changed; and for each requested block, incrementing the block address in the control block before processing a next block, wherein the incremented block address is used as the requested address to compare with the block address in the metadata for the next requested block.

24. The integrated circuit device of claim 23, wherein the operation performed on the customer data comprises XOR-ing the customer data and wherein the error checking code comprises a longitudinal redundancy checking code.

25. The integrated circuit device of claim 23, wherein the integrated circuit logic is separate from a main processor, and wherein the control logic transfers the block of data from the storage device to the requesting application using a direct memory access (DMA) channel that bypasses the main processor.

26. The integrated circuit device of claim 23, wherein the logic further performs:

transferring each requested block including the customer data and metadata to cache after determining that the block address in the metadata in the storage device and the requested address match and determining that the customer data in the storage device has not changed;

for each requested block, determining whether the address of the block of data in the metadata in the cache and the requested address match;

for each requested block, performing an operation on the customer data in the block in the cache and the error checking code in the metadata in cache to determine whether the customer data in cache has changed, wherein the customer data of the requested block is transferred to the requesting application from the cache if the address of the block in the metadata in cache and the requested address match and the customer data in the cache has not changed.

27. The integrated circuit device of claim 26, wherein a processor generates a first control block in the cache indicating the block address of a first requested block at the first address of the requested contiguous addresses and whether to check the address and error code of the block, and wherein the integrated circuit device determines whether the block address in the metadata in the storage device and the requested address match by using the block address in the first control block in the cache as the requested address to compare with the block address in the metadata in the storage device;

wherein the integrated circuit device logic increments, for each requested block, the block address in the first control block after transferring the block from the storage device to the cache, wherein the incremented block address is used as the requested address to compare with the block address in the metadata for the next requested block; and wherein the processor generates a second control block in cache indicating the block address of a first requested block at the first address of the requested contiguous addresses and whether to check the address and error code of the block, wherein the integrated circuit device determines whether the block address in the metadata in the cache and the requested address match by using the block address in the second control block in the cache as the requested address to compare with the block address in the metadata in the cache.

28. The integrated circuit device of claim 27, wherein the logic further performs:

incrementing the block address in the second control, block for each requested block after transferring the block from the cache to the requesting application, wherein the incremented block address is used as the requested address to compare with the block address in the metadata in the cache for the next requested block.

29. An integrated circuit device including logic for transferring data to a requesting application, wherein the logic performs:

receiving a request for one or more blocks of data at contiguous addresses in a storage device, wherein each block of data includes customer data and metadata indicating the address of the block in the storage device and an error checking code that is capable of being used to determine whether the customer data in the block has changed;

for each requested block, determining whether the address of the block of data in the metadata and the requested address match;

for each requested block, performing an operation on the customer data in the block and the error checking code to determine whether the customer data has changed; and for each requested block, transferring the requested block to the requesting application if the address of the block in the metadata and requested address match and the customer data has not changed, wherein a processor generates a control block indicating the block address of a first requested block at the first address of the requested contiguous addresses and whether to check the address and error code of the block, wherein the integrated circuit determines whether the block address in the metadata and the requested address match comprises by using the block address in the control block as the requested address to compare with the block address in the metadata, aid wherein the integrated circuit logic further performs, for each requested block, incrementing the block address in the control block before processing a next block, wherein the incremented block address is used as the requested address to compare with the block address in the metadata for the next requested block.

30. The integrated circuit device of claim 29, wherein the integrated circuit logic indicates the block address in the control block by indicating a target address of a block having a corresponding source block that has not yet been copied to the block at the target address, and wherein transferring the requested block comprises transferring the customer data in the block at the source address.

31. A integrated circuit device including logic for transferring data to a request application, wherein the logic performs:

receiving a request for one or more blocks of data at contiguous addresses in a storage device, wherein each block of data includes customer data and metadata indicating the address of the block in the storage device and an error checking code that is capable of being used to determine whether the customer data in the block has changed, wherein the requested blocks at contiguous addresses comprise target blocks at contiguous target addresses in a copy relationship with source blocks at contiguous source addresses that have not yet been copied to the target blocks;

for each requested block, determining whether the address of the block of data in the metadata and the requested address match;

for each requested block performing an operation on the customer data in the block and the error checking code to determine whether the customer data has changed; and for each requested block transferring the requested block to the requesting application if the address of the block in the metadata and requested address match and the customer data has not changed;

transferring the customer data and metadata in the block at the source address in the storage device to be copied to the requested target block to the cache; and replacing tile block address in the metadata in the cache with the requested target address before determining whether the address of the block of data in the metadata in the cache and the requested target address match.

32. The integrated circuit device of claim 31, wherein the logic is further capable of performing:

recalculating the error code from the customer data in the cache before performing the operation on the customer data in the cache.

33. A computer readable medium including at least one data structure used in transferring data from a storage device to a requesting application, comprising:

blocks of customer data;

a block of metadata for each block of customer data, wherein the metadata includes the address of the block in the storage device and an error checking code, wherein the metadata is used when processing a request for one or more blocks of data at contiguous addresses in a storage device such that the requested block of customer data is only transferred to the requesting application if the address of the block in the metadata and requested address match and an error checking operation using the error checking code indicates that the customer data has not changed; and a control block set up to indicate She block address of a first requested block, and for each requested block, incrementing the block address in the control block before processing a next block, wherein the incremented block address is used as the requested address to compare with the block address in the metadata for the next requested block.

34. The computer readable medium of claim 33, wherein the error checking code comprises a longitudinal redundancy checking code.

35. A computer readable medium including at least one data structure used in transferring data from a storage device to a requesting application, comprising:

blocks of customer data;

a block of metadata for each block of customer data, wherein the metadata includes the address of the block in the storage device and an error checking code, wherein the metadata is used when processing a request for one or more blocks of data at contiguous addresses in a storage device such that the requested block of customer data is only transferred to the requesting application if the address of the block in the metadata and requested address match and an error checking operation using the error checking code indicates that the customer data has not changed; and a control block indicating the block address of a first requested block at the first address of the requested contiguous addresses and whether to check the address and error code of the block, wherein determining whether the block address in the metadata and the requested address match comprises using the block address in the control block as the requested address to compare with the block address in the metadata, and wherein for each requested block, the block address in the control block is incremented before processing a next block, wherein the incremented block address is used as the requested address to compare with the block address in the metadata for the next requested block.

36. The computer readable medium of claim 35, wherein the control block indicates the block address by indicating a target address of a block having a corresponding source block that has not yet been copied to the block at the target address, wherein transferring the requested block comprises transferring the customer data in the block at the source address.

37. A computer readable medium including east one data structure used in transferring data from a storage device to a requesting application, comprising:

blocks of customer data;

a block of metadata for each block of customer data, wherein the metadata includes the address of the block in the storage device and an error checking code, wherein the metadata is used when processing a request for one or more blocks of data at contiguous addresses in a storage device such that the requested block of customer data is only transferred to the requesting application if the address of the block in the metadata and requested address match and an error checking operation using the error checking code indicates that the customer data has not changed; and a first control block in the cache indicating the block address of a first requested block at the first address of the requested contiguous addresses and whether to check the address and error code of the block, wherein the block address in the first control block in the cache is used as the requested address to compare with die block address in the metadata in the storage device, and wherein, for each requested block, the block address in the first control block is incremented after transferring the block from the storage device to the cache, wherein the incremented block address is used as the requested address to compare with the block address in the metadata for the next requested block; and a second control block in cache indicating the block address of a first requested block at the first address of the requested contiguous addresses and whether to check the address and error code of the block, wherein the block address in the second control block in the cache is used as the requested address to compare with the block address in the metadata in the cache.

\* \* \* \* \*

UNITED STATES PATENT AND TRADEMARK OFFICE
CERTIFICATE OF CORRECTION

PATENT NO. : 6,715,036 B1  
APPLICATION NO. : 09/628394  
DATED : March 30, 2006  
INVENTOR(S) : David Alan Burton et al.

Page 1 of 1

It is certified that error appears in the above-identified patent and that said Letters Patent is hereby corrected as shown below:

Column 14, line 30, delete "dot" and insert -- data --.  
Line 42, delete "bock" and insert -- block --.

Column 16, line 9, delete "fist" and insert -- first --.  
Line 18, delete "blocks" and insert -- block --.

Column 19, line 47, delete "a integrated" and insert -- an integrated --.  
Line 48, delete "request" and insert -- requesting --.

Column 20, line 8, delete "tile block" and insert -- the block --.  
Line 33, delete "She block" and insert -- The block --.

Column 22, line 8, delete "with die" and insert-- with the --.

Signed and Sealed this

Fifth Day of December, 2006

JON W. DUDAS  
*Director of the United States Patent and Trademark Office*

UNITED STATES PATENT AND TRADEMARK OFFICE
CERTIFICATE OF CORRECTION

PATENT NO. : 6,715,036 B1  
APPLICATION NO. : 09/628394  
DATED : March 30, 2004  
INVENTOR(S) : David Alan Burton et al.

Page 1 of 1

It is certified that error appears in the above-identified patent and that said Letters Patent is hereby corrected as shown below:

<u>Column 14,</u> line 30, delete "dot" and insert -- data --.
Line 42, delete "bock" and insert -- block --.

<u>Column 16,</u> line 9, delete "fist" and insert -- first --.
Line 18, delete "blocks" and insert -- block --.

<u>Column 19,</u> line 47, delete "a integrated" and insert -- an integrated --.
Line 48, delete "request" and insert -- requesting --.

<u>Column 20,</u> line 8, delete "tile block" and insert -- the block --.
Line 33, delete "She block" and insert -- The block --.

<u>Column 22,</u> line 8, delete "with die" and insert-- with the --.

This certificate supersedes Certificate of Correction issued December 5, 2006.

Signed and Sealed this

Ninth Day of January, 2007

JON W. DUDAS
*Director of the United States Patent and Trademark Office*